United States Patent [19]
Bohme et al.

[11] 3,890,292
[45] June 17, 1975

[54] ADHESIVE COMPOSITIONS AND TAPES

[75] Inventors: Reinhard D. Bohme, Hinsdale; Perlita A. Ilagan, Chicago, both of Ill.

[73] Assignee: Daubert Chemical Company, Oak Brook, Ill.

[22] Filed: May 23, 1973

[21] Appl. No.: 363,013

[52] U.S. Cl. .... 260/80.76; 117/122 PA; 117/123 D; 260/31.4 R; 260/31.8 R; 260/80.75; 260/86.1 R; 260/86.1 E
[51] Int. Cl. ............................................. C08f 15/40
[58] Field of Search............. 260/80.8, 80.75, 80.76

[56] References Cited
UNITED STATES PATENTS
3,809,685   5/1974   Sato et al........................ 260/80.71

*Primary Examiner*—Stanford M. Levin
*Attorney, Agent, or Firm*—Wallenstein, Spangenberg, Hattis & Strampel

[57] ABSTRACT

Water dispersible pressure sensitive adhesive compositions comprising ionomeric copolymers of hydrophilic and hydrophobic monomers. In their preferred form the compositions comprise a copolymer formed of an ionic monomer such as a water soluble alkali metal salt of an $\alpha, \beta$ unsaturated monocarboxylic acid, a nonionic monomer such as a water soluble polyoxyalkylene ester of an $\alpha, \beta$ unsaturated monocarboxylic acid, and copolymerizable monomers comprising an $\alpha, \beta$ unsaturated monocarboxylic acid and a insoluble alkyl ester of such an acid. The compositions in dry form are normally tacky and substantially moisture stable. The compositions are useful in the making of various types of tapes, including transfer tapes.

5 Claims, No Drawings

ADHESIVE COMPOSITIONS AND TAPES

Water soluble, or dispersible, adhesives, and tapes utilizing such adhesives, have been the subject matter of a number of prior patents as exemplified by U.S. Pat. Nos. 2,838,421, 3,152,940, 3,321,451, 3,341,505 and 3,441,430. Two of the patents, namely U.S. Pat. Nos. 3,321,451 and 3,341,505 teach the use of a functional amine monomer to attain solubility, or dispersibility, of the adhesive. U.S. Pat. No. 3,341,505 teaches the use of a combination of alkali-soluble and water soluble materials to attain a like result. U.S. Pat. Nos. 2,838,421 and 3,441,430 each disclose compositions comprised wholly of hydrophilic materials. In the case of the compositions of U.S. Pat. No. 3,441,430, it is necessary to incorporate a high percentage of a water soluble tackifying plasticizer to impart adequate adhesive properties to the compositions. Various of these prior water soluble, or water dispersible adhesive compositions have a number of shortcomings, chief among which are their sensitivity to moisture and their unstable tack properties under varying humidity conditions.

In accordance with the present invention, adhesive compositions have been evolved which have excellent water dispersibility properties, and which, when dry, have superior adhesive capabilities. The compositions, when dry, moreover, maintain their excellent tack characteristics at both high and low humidities, and manifest greatly improved moisture stability properties.

The adhesive compositions of this invention comprise copolymers formed of both hydrophilic and hydrophobic monomers. At least one of the hydrophilic monomers is ionic in character. Another of the hydrophilic monomers is nonionic in character. The compositions, themselves, are ionomeric in character. More specifically, the compositions comprise a copolymer formed of an ionic monomer in the form of a water soluble alkali metal salt of an $\alpha$, $\beta$ unsaturated monocarboxylic acid, a nonionic monomer in the form of a water soluble polyoxyalkylene ester of an $\alpha$, $\beta$ unsaturated monocarboxylic acid, and copolymerizable monomers which advantageously comprise an $\alpha$, $\beta$ unsaturated monocarboxylic acid and a water insoluble alkyl ester of an $\alpha$, $\beta$ unsaturated monocarboxylic acid. In accordance with one aspect of the invention, a portion of the water insoluble alkyl ester can be replaced by a vinyl ester. Various supplemental materials are desirably incorporated into the compositions to enhance or augment the properties thereof.

The ionomeric nature, and, concomitantly, the excellent water dispersibility characteristics of the compositions are attributable, in the main, to the utilization of an ionic, water soluble monomer. As stated, the ionic monomer comprises a water soluble alkali metal salt of an $\alpha$, $\beta$ unsaturated monocarboxylic acid. Exemplary of such salts are the sodium potassium, lithium, rubidium and cesium salts of acrylic and methacrylic acid. Of this group, sodium and potassium acrylate or methacrylate are preferred. The alkali metal salt can be incorporated into the compositions as such, or it can be formed in situ during the formulation of the compositions. The proportion of ionic monomer employed can range from about 4 to about 10 percent, usually from about 5 to about 8 percent, by weight, of the compositions.

The water soluble nonionic monomers used in the compositions are polyalkylene oxide condensation products with an $\alpha$, $\beta$ unsaturated monocarboxylic acid exemplified by acrylic acid and methacrylic acid. These esters advantageously contain at least 2, usually from about 10 to about 15, and upwards of 100, or more, alkylene oxide groups such as ethylene oxide, propylene oxide, butylene oxide, and the like. Typical of such products are the polyethylene oxide acrylates sold under the designations "Tergitol 15-S-12" and "Carbowax 550" (Union Carbide). Each of these products contains 12 ethylene oxide units, and differ from each other in the number of carbon atoms in the alkyl group. While lower molecular weight hydrophilic acrylate and methacrylate monomers such as methoxy acrylate, ethoxyethyl acrylate, and the like, can be used in the compositions, it is preferred to use higher molecular weight alkylene oxide monomers because lesser quantities of the latter are required to provide a product having the desired properties. The proportion of the water soluble nonionic monomers employed in the compositions is somewhat variable. Generally speaking, however, the nonionic monomer comprises from about 6 to about 20 percent, especially desirably from about 10 to about 15 percent, by weight, of the compositions.

The copolymerizable monomers employed in the compositions of this invention comprise from about 70 to about 90 percent, by weight, of the compositions. The monomers include $\alpha$, $\beta$ unsaturated monocarboxylic acids such as acrylic or methacrylic acid, and hydrophobic, or essentially water insoluble, alkyl esters of $\alpha$, $\beta$ unsaturated monocarboxylic acids. Exemplary of these esters are acrylic and methacrylic acid esters of $C_1$–$C_{18}$ alkyl alcohols such as methyl acrylate, ethyl acrylate, butyl acrylate, 2-ethylhexyl acrylate, cyclohexyl acrylate, lauryl acrylate, stearyl acrylate, methyl methacrylate, ethyl methacrylate, butyl methacrylate, hexyl methacrylate, 2-ethylhexyl methacrylate, decyl-octyl methacrylate, lauryl methacrylate, stearyl methacrylate, and the like. The proportion of $\alpha$, $\beta$ unsaturated monocarboxylic acid monomer comprising the copolymerizable monomers can range from 0 to about 20 percent, by weight, thereof. The proportion of the hydrophobic alkyl ester monomer comprising the copolymerizable monomers can vary from about 70 to about 90 percent, by weight, thereof.

As indicated hereinabove, a portion of the hydrophobic, or water insoluble, alkyl esters comprising the copolymerizable monomers can be replaced, or substituted, by a vinyl ester. Exemplary of such esters are vinyl acetate, vinyl propionate, vinyl butyrate, vinyl stearate, and the like. The vinyl ester, when used, can comprise from about 10 to about 40 percent, usually from about 20 percent to about 25, by weight, of the copolymerizable monomers.

Also as indicated hereinabove, various supplemental materials desirably are incorporated into the compositions to enhance and augment the properties thereof. Thus, for example, the tack, flexibility and/or film forming properties of the adhesive compositions can be improved by incorporating plasticizers and flow reducing agents, or fillers, into the compositions. Either water insoluble or water soluble plasticizers, or a combination thereof, can be employed. Specific examples of water insoluble plasticizers which can be used are di-isodecyl phthalate, dibutyl phthalate, butyl benzyl phthalate, butyl cyclohexyl phthalate, or the like. Exemplary of water soluble plasticizers which can be used are the polyethylene glycol monophenyl ethers available commercially under the trade designations "Pycal 94" (Atlas Powder Company) and "Gafac LO-529" (GAF). The proportion of water insoluble and water soluble plasticizer employed each can range from about 1 to about 15 percent, preferably from about 5 to about 10 percent, by weight, of the compositions.

The flow reducing agents, or fillers, used in the compositions include bentonite clay, talc, diatomaceous earth, bark flours, zinc oxide, hydrated silicas such as "Cab-O-Sil" (Cabot), and the like. The proportion of flow reducing agent incorporated into the compositions can range from about 1 to about 5 percent, usually about 2 to about 4 percent, by weight, of the compositions.

In preparing the compositions of this invention, standard adhesive formulation techniques can be employed. Thus, by way of illustration, the water soluble nonionic monomer, together with the copolymerizable monomers, for instance, an $\alpha, \beta$ unsaturated monocarboxylic acid and a water insoluble alkyl ester of such as acid, can be introduced into a suitable reaction vessel along with one or more polymerization catalysts. After the mixture has been polymerized, a sufficient amount of an alkali metal hydroxide is added to neutralize at least 4 percent of the acid to impart an ionomeric character to the final composition and render it water dispersible. The term "dispersible" as used herein is intended to mean that the compositions are capable of being dispersed or dissolved in water alone.

The adhesive compositions can be used to make transfer tapes, splicing tapes, and the like. Conventional coating methods can be employed in the fabrication of such tapes with the compositions.

The following examples are illustrative of the water dispersible pressure sensitive adhesive compositions of this invention. It should be understood that these examples are not intended to be limitative of the invention since various changes in the formulation of the compositions can be made in the light of the guiding principles and teachings provided herein.

EXAMPLE 1

Into a one liter flask equipped with a reflux condenser are added 140.6 grams of 2-ethylhexyl acrylate, 27.6 grams of a 50 percent water solution of polyethylene oxide acrylate ("Tergitol 15-S-12"), 31.8 grams of acrylic acid, and 250 grams of methyl ethyl ketone. The mixture is purged with nitrogen to expel oxygen, and is then blanketed with nitrogen. To this mixture, 0.4 gram of n-butyl mercaptan and 0.4 gram of $\alpha, \beta$-isobisazobutyronitrile are added, and the mixture is polymerized at 65°C for about 18 hours. To 80 parts of the resulting polymer in solution, 5.8 grams of a 50 percent solution of potassium hydroxide are added. The final copolymer comprises 75.4 percent 2-ethylhexyl acrylate, 5.25 percent potassium acrylate, 11.8 percent acrylic acid, and 7.4 percent polyethylene oxide acrylate. When coated and dried, the polymer is tacky and water soluble.

EXAMPLE 2

Several copolymers are prepared in accordance with the procedure outlined in Example 1, and evaluated with the copolymer of Example 1 with respect to solubility and tack. The results are tabulated in Table 1 below:

TABLE I

|  | 2-ETHYLHEXYL ACRYLATE GRAMS | POTASSIUM ACRYLATE GRAMS | ACRYLIC ACID GRAMS | TERGITOL 15-S-12 ACRYLATE GRAMS | TACK LEVEL | SOLUBILITY IN WATER |
|---|---|---|---|---|---|---|
| Comp. of Ex. 1 | 75.4 | 5.25 | 11.8 | 7.4 | Tacky | Soluble |
| Comp. 2 | 75.4 | 0 | 17.0 | 7.4 | Tacky | Insoluble |
| Comp. 3 | 75.4 | 0 | 0 | 24.4 | High | Insoluble |
| Comp. 4 | 75.4 | 0 | 24.4 | 0 | Low | Insoluble |
| Comp. 5 | 75.4 | 14 | 10 | 0 | Very Low | (Formed Gel) |

EXAMPLE 3

Following the procedure outlined in Example 1, a copolymer is prepared in 100 grams of ethyl acetate from 30 grams of 2-ethylhexyl acrylate, 5 grams of methylacrylate, 40 grams of ethyl acrylate, 10 grams of acrylic acid, and 15 grams of polyoxyethylene acrylate ("Tergitol 15-S-12"). To one portion (3a) of the copolymer, sufficient potassium hydroxide is added to neutralize 50 percent of the acrylic acid. To another portion (3b) of the copolymer, sufficient potassium hydroxide is added to neutralize all of the acrylic acid present. The results are set forth below in Table II:

TABLE II

|  | NON-FUNCTIONAL MONOMER, g | ACRYLIC ACID, g | POTASSIUM ACRYLATE, g | TERGITOL 15-S-12 ACRYLATE, g | SOLUBILITY | % PLASTICIZER | ADHESIVE PERFORMANCE |
|---|---|---|---|---|---|---|---|
| Comp. of Ex. 3 | 75 | 5 | 0 | 15 | Insoluble | 3 | — |
| Comp. 3a | 75 | 2.5 | 3.9 | 15 | Insoluble | 3 | 825 g/in.peel |
| Comp. 3b | 75 | 0 | 7.8 | 15 | Soluble | 3 | 800 g/in.peel |

EXAMPLE 4

To each of the copolymers of Example 2, equal amounts of a water soluble plasticizer and a water insoluble plasticizer are admixed. The water soluble plasticizer is a polyethylene glycol monophenyl ether having an average molecular weight of 270 which is sold under the trade designation "Pycal 94" (Atlas Powder Co.). The water insoluble plasticizer is diisodecylphthalate (DIDP). The results of the compounding with respect to tack, tack sensitivity to humidity, and water dispersibility are set forth below in Table III:

TABLE III

|  | g PYCAL 94/PER 100g POLYMER | g DIDP PER 100g POLYMER | ADHESIVE APPEARANCE | SURFACE TACK | | | DISPERSABILITY IN WATER |
|---|---|---|---|---|---|---|---|
|  |  |  |  | 90% rH | 50% rH | 10% rH |  |
| Comp. of Ex. 1 | 10 | 6.8 | Soft | 125 | 195 | 153 | Soluble |
| Comp. 2 | 10 | 6.8 | Soft | 113 | 76 | 87 | Insoluble |
| Comp. 3 | 10 | 6.8 | Very Weak | 10 | 10 | 34 | Insoluble |
| Comp. 4 | 10 | 6.8 | Hard | 500 | 450 | 183 | Insoluble |
| Comp. 5 | 10 | 6.8 | Not suitable for adhesive due to gellation | | | | |

"Soft" in TABLE III indicates that surface tack is sufficiently high to cause transfer of the adhesive to a test loop under the conditions of the test.

METHOD FOR DETERMINING TACK IN EXAMPLE 4:

To determine the adhesive surface tack as a function of relative humidity of coated samples, the adhesive is coated 1 mil thick onto the surface of a glass plate and conditioned for 24 hours in a dessicator partially filled with a moisture controlling salt solution.

The loop method is used for determining the tack wherein a strip (½ inch wide, 6 inches long) of polyester film is looped and allowed to contact the adhesive under its own weight. After a 10 second residence time the loop is lifted and the force required to remove the loop is measured. The reading obtained, averaged over the number of measurements are recorded as tack in TABLE III.

EXAMPLE 5

To a glass vessel equipped with stirrer, condenser and nitrogen purge are added 39 parts of 2-ethylhexyl acrylate, 35 parts of ethyl acrylate, 5 parts of methyl acrylate, 7 parts of acrylic acid, 14.7 parts of "Tergitol 15-S-12", 0.7 part of n-dodecyl mercaptan, and 0.5 part of catalyst (VAZO). To the mixture are added 150 grams of ethyl acetate, and the mixture is polymerized between 140° and 160°F for 10 hours. 5 parts of sodium hydroxide in a methanolic solution are then added to the polymerized mixture to neutralize and convert the acrylic acid to sodium acrylate. The finished adhesive copolymer is coated on paper, and evaluated for tackiness, peel strength and dispersibility:

| Surface tack | Medium |
|---|---|
| 180° peel strength, g/in. | 450 grams |
| Dispersibility | Good |

EXAMPLE 6

Following the procedure outlined in Example 5, a copolymer is formed of:

| 2-ethylhexyl acrylate | 35 parts |
|---|---|
| Ethyl acrylate | 40 parts |
| Methyl acrylate | 5 parts |
| Acrylic acid | 5 parts |
| Tergitol 15-S-12 | 15 parts |
| n-dodecyl mercaptan | 0.6 part |
| Catalyst (VAZO) | 0.5 part |

Following polymerization, 1.8 parts of sodium hydroxide in a methanolic solution are added to the polymerized mixture to neutralize and convert the acrylic acid to sodium acrylate. The finished adhesive copolymer is coated on paper, and evaluated for tackiness, peel strength and dispersibility:

| Surface tack | Medium |
|---|---|
| 180° peel strength, g/in. | 650 grams |
| Dispersibility | Good |

What is claimed is:

1. A water dispersible pressure sensitive adhesive composition which in dry form is normally tacky and substantially moisture stable consisting essentially of a copolymer formed of from about 4 to about 10 percent, by weight, of a water soluble alkali metal salt of an $\alpha$, $\beta$ unsaturated monocarboxylic acid, from about 6 to about 20 percent, by weight, of a water soluble polyoxyalkylene monoester of an $\alpha$, $\beta$ unsaturated monocarboxylic acid, said monoester containing at least two alkylene oxide units, with from about 70 to about 90 percent, by weight, of copolymerizable monomers, said monomers consisting essentially of 0 to about 20 percent, by weight, of an $\alpha$, $\beta$ unsaturated monocarboxylic acid, and about 50 to about 90 percent, by weight, of a substantially water insoluble alkyl ester of an $\alpha$, $\beta$ unsaturated monocarboxylic acid, or a mixture of a substantially water insoluble alkyl ester of an $\alpha$, $\beta$ unsaturated monocarboxylic acid and a vinyl ester, the vinyl ester comprising from about 10 to about 40 percent, by weight, of the mixture.

2. A composition according to claim 1 wherein the $\alpha$, $\beta$ monocarboxylic acid is acrylic or methacrylic acid.

3. A composition according to claim 1 wherein the alkylene oxide units have from two to three carbon atoms per unit.

4. A composition according to claim 3 wherein the polyoxyalkylene ester is polyoxyethylene acrylate or polyoxypropylene acrylate.

5. A composition according to claim 1 wherein the water soluble alkali metal salt is sodium or potassium acrylate or methacrylate.

* * * * *